(12) United States Patent  
Waring

(10) Patent No.: US 7,476,348 B2
(45) Date of Patent: Jan. 13, 2009

(54) LINER INSTALLATION IN PIPES

(75) Inventor: Stephen T. Waring, Redmond, OR (US)

(73) Assignee: High Bar, LLC, Redmond, OR (US)

( * ) Notice: Subject to any disclaimer, the term of this patent is extended or adjusted under 35 U.S.C. 154(b) by 879 days.

(21) Appl. No.: 11/072,015

(22) Filed: Mar. 4, 2005

(65) Prior Publication Data

US 2006/0197262 A1    Sep. 7, 2006

(51) Int. Cl.
B29C 63/36 (2006.01)
(52) U.S. Cl. .................. 264/36.17; 138/97; 156/94; 425/11; 425/387.1
(58) Field of Classification Search .................. 425/11, 425/13, 14, 387.1; 264/36.17, 516; 156/94, 156/287; 138/97, 98; 405/150.1
See application file for complete search history.

(56) References Cited

U.S. PATENT DOCUMENTS

| | | | |
|---|---|---|---|
| 4,009,063 A | 2/1977 | Wood | |
| 4,043,157 A | 8/1977 | Schiffer | |
| 4,064,211 A | 12/1977 | Wood | |
| 4,077,610 A | 3/1978 | Masuda | |
| 4,135,958 A | 1/1979 | Wood | |
| 4,368,091 A | 1/1983 | Ontsuga et al. | |
| 4,385,885 A | 5/1983 | Wood | |
| 4,427,480 A | 1/1984 | Kamuro et al. | |
| 4,581,085 A | 4/1986 | Wood | |
| 4,626,133 A | 12/1986 | Waring | |
| 4,640,313 A | 2/1987 | Stanley | |
| 4,655,638 A | 4/1987 | Waring | |
| 4,668,125 A | 5/1987 | Long, Jr. | |
| 4,685,983 A * | 8/1987 | Long, Jr. ............. | 156/64 |
| 4,752,511 A | 6/1988 | Driver | |
| 4,770,562 A | 9/1988 | Muller et al. | |
| 4,883,557 A | 11/1989 | Morinaga et al. | |
| 4,948,452 A | 8/1990 | Morinaga et al. | |
| 5,044,405 A | 9/1991 | Driver et al. | |
| 5,108,533 A | 4/1992 | Long, Jr. et al. | |
| 5,154,936 A | 10/1992 | Driver et al. | |

(Continued)

FOREIGN PATENT DOCUMENTS

EP    0 620 100 A2    10/1994

(Continued)

OTHER PUBLICATIONS

U.S. Appl. No. 60/638,402, filed Dec. 27, 2004, Taylor, et al.

(Continued)

Primary Examiner—Robert B Davis
(74) Attorney, Agent, or Firm—Chernoff, Vilhauer, McClung & Stenzel, LLP

(57) ABSTRACT

Apparatus and a method for installing a tubular liner in a pipe, as in repair of underground sewer piping. A feeder is of flexible material, which may be similar to that of which the tubular liner is made, and is connected to an end of the tubular liner. The feeder includes a throat portion through which a quantity of inside-out tubular liner is drawn into the feeder by fluid pressure within the feeder and beyond the throat, and the tubular liner is thence urged by fluid pressure into the pipe where it is to be installed.

22 Claims, 4 Drawing Sheets

U.S. PATENT DOCUMENTS

| | | | |
|---|---|---|---|
| 5,223,204 A | 6/1993 | Endoh | |
| 5,358,359 A * | 10/1994 | Long, Jr. | 405/184.2 |
| 5,374,174 A | 12/1994 | Long, Jr. | |
| 5,490,964 A | 2/1996 | Kamiyama et al. | |
| 5,520,484 A | 5/1996 | Kamiyama et al. | |
| 5,597,353 A | 1/1997 | Alexander, Jr. | |
| 5,676,175 A | 10/1997 | Bar et al. | |
| RE35,944 E * | 11/1998 | Driver et al. | 264/570 |
| 5,927,341 A | 7/1999 | Taylor | |
| 5,942,183 A | 8/1999 | Alexander, Jr. | |
| 5,969,234 A | 10/1999 | Weigele | |
| 6,170,531 B1 | 1/2001 | Jung et al. | |
| 6,354,330 B1 | 3/2002 | Wood | |
| 6,354,334 B1 | 3/2002 | Ellyin et al. | |
| 6,390,795 B1 | 5/2002 | Waring et al. | |
| 6,641,687 B2 | 11/2003 | Kiest, Jr. et al. | |
| 6,679,293 B2 | 1/2004 | Driver | |
| 6,682,668 B1 | 1/2004 | Driver et al. | |
| 6,708,728 B2 | 3/2004 | Driver et al. | |
| 6,827,526 B2 | 12/2004 | Warren | |
| 6,837,273 B2 | 1/2005 | Woolstencroft et al. | |
| 6,960,313 B2 * | 11/2005 | Waring et al. | 264/36.17 |
| 7,051,766 B2 * | 5/2006 | Kamiyama et al. | 138/98 |
| 7,096,890 B2 | 8/2006 | Woolstencroft et al. | |
| 2006/0093436 A1 * | 5/2006 | Gearhart | 405/184.2 |
| 2006/0137816 A1 | 6/2006 | Taylor et al. | |

FOREIGN PATENT DOCUMENTS

| | | |
|---|---|---|
| GB | 1044645 | 10/1966 |
| JP | 01-204726 | 8/1989 |

OTHER PUBLICATIONS

Jeff Griffin, Air Inversion CIPP increases Productivity, 1 page, article in Underground Construction magazine Nov. 2004 issue, p. 49.

S.T. Waring, Demonstration Project of the Gelco Remedial Waterstop to Rehabilitate Monolith Joint Waterstops at Pine Flat Dam in Fresno County, CA, 1985, US Army Engineering.

Gelco Grouting Service, Maintenance & Rehabilitation, Pressure Pot, Jun. 5, 1985, sheets 1-4,—Technical Services, Salem, Oregon.

Waring, three pages containing 1 photograph on each page, 1998.

Waring, Launcher, 5 pages of drawings, Oct. 1998, Gelco.

Leffler, Air Inverter Flapper Valve Detail, two sheets of drawings, Nov. 2, 1998.

\* cited by examiner

LINER INSTALLATION IN PIPES

BACKGROUND OF THE INVENTION

The present invention relates to apparatus and a method for feeding and inverting a flexible tubular liner into the interior of a hollow tubular vessel, such as a previously existing underground sewer pipe.

Underground pipes are used as conduits for sewage or water supplies and may begin to leak after time as a result of ground movement, nearby construction, erosion, or other factors. It is well known to repair underground pipes by using fluid pressure to invert a flexible liner into the pipe, where the liners can be secured by chemically hardening resin with which the liner is impregnated before being installed. Previously, large, heavy and unwieldy containers have been used to retain and control fluid under pressure to urge the liner, originally in an inside-out condition, to extend along and through a length of underground pipe to be repaired by installation of the liner, and invert itself progressively in a required position. As used herein the term pipe is meant to include other elongate tubular structures that can be repaired by installation of such liners, as well as the sewer and water pipes specifically mentioned above.

One of the more successful pipe repair or rehabilitation processes which is currently used is described in Wood U.S. Pat. No. 4,064,211. Wood U.S. Pat. No. 4,385,885 discloses apparatus useful in installing a liner according to the process described in U.S. Pat. No. 4,064,211. Various sealing devices have been disclosed for use in connection with using fluid under pressure to extend and invert a liner into a conduit to be repaired, as shown, for example, in Alexander, Jr., U.S. Pats. Nos. 5,597,353 and 5,942,183, Long, Jr., U.S. Pat. No. 5,358,359, and Driver, et al., U.S. Pats. Nos. 5,154,936 and Re. 35,944.

Other apparatus for use in installing and inverting a liner, as disclosed in Long, Jr., U.S. Pats. Nos. 4,668,125 and 4,685,983, has been quite large, and has used a relatively tall column of water to provide the necessary fluid pressure within the liner being inverted. Such apparatus has been undesirably unwieldy and expensive, particularly for repair of large-diameter sewer pipes.

Waring et al. U.S. Pat. No. 6,390,795 discloses a smaller apparatus useful for installation of liners in medium sized pipes, but the apparatus still includes a rigid, heavy pressure containment vessel to which an end of a liner is attached, and through which the liner is fed.

What is desired, then, is to provide a conveniently small and inexpensive apparatus and an improved method useful to invert and install a flexible tubular liner quickly and efficiently into a pipe.

SUMMARY OF THE INVENTION

The present invention supplies an answer to the aforementioned need for a relatively small and inexpensive apparatus and a method for its use in installing a flexible tubular liner in a tubular vessel. A feeder of flexible material may be attached to or manufactured integrally with a length of a flexible tubular liner, and includes a mouth leading to a throat for receiving and conducting a liner in the form of a flat-folded, flexible inside-out tube into an adjacent flexible pressure-containing section from which such a tubular liner can be extended and inverted into position for use to repair or line a pipe. The pressure-containing section acts to hold air or another fluid under pressure to act on the flexible tubular liner. The feeder can be supported by a simple support structure where the liner is to be installed.

A throat supporting mechanism is provided to shape and support the throat around the flexible tubular liner, in such a way as to allow the liner to enter the flexible feeder longitudinally through the throat in a flattened, folded, inside-out configuration without excessive loss of pressure from the pressure-containing section, so that the pressure of the fluid in the feeder and in an adjacent portion of the tubular liner can be used to extend and invert the tubular liner into the required position within a pipe.

The throat of the feeder in one embodiment includes a flexible sealing flap mounted in the throat. In use of the flexible feeder, fluid under pressure within the pressure-containing section acts on such a flap and urges it toward the opposite side of the throat and against an object such as a flattened flexible tubular liner passing through the throat, to seal the throat yet allow the flexible tube to slide into the pressure-containing section of the feeder.

The foregoing and other objectives, features, and advantages of the invention will be more readily understood upon consideration of the following detailed description of the invention, taken in conjunction with the accompanying drawings.

DETAILED DESCRIPTION OF PREFERRED EMBODIMENT

Figure 1:
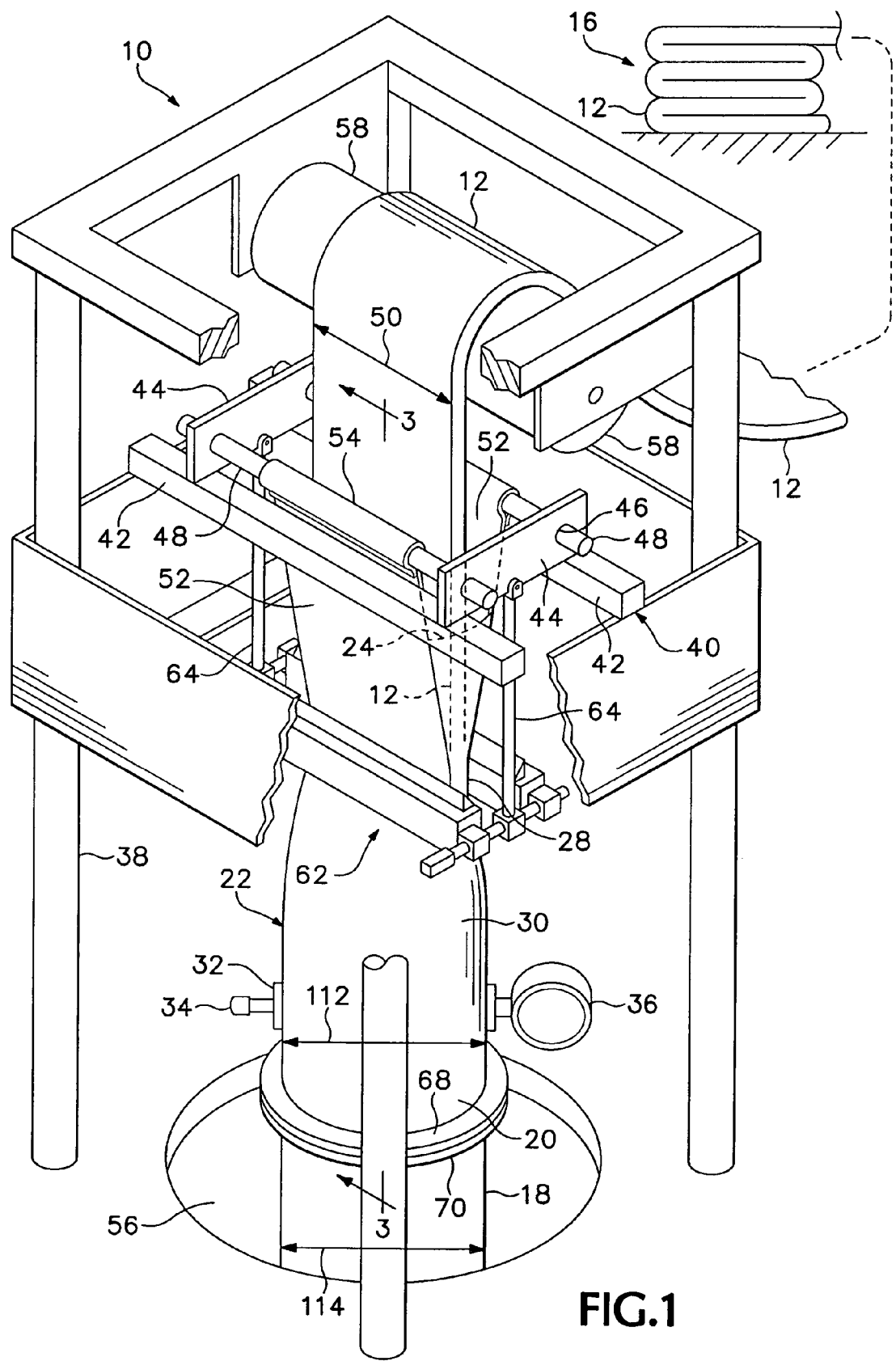
FIG. 1 is a partially cutaway isometric view of a support apparatus together with a liner and feeder combination which is an exemplary embodiment of one aspect of the present invention.
Figure 2:
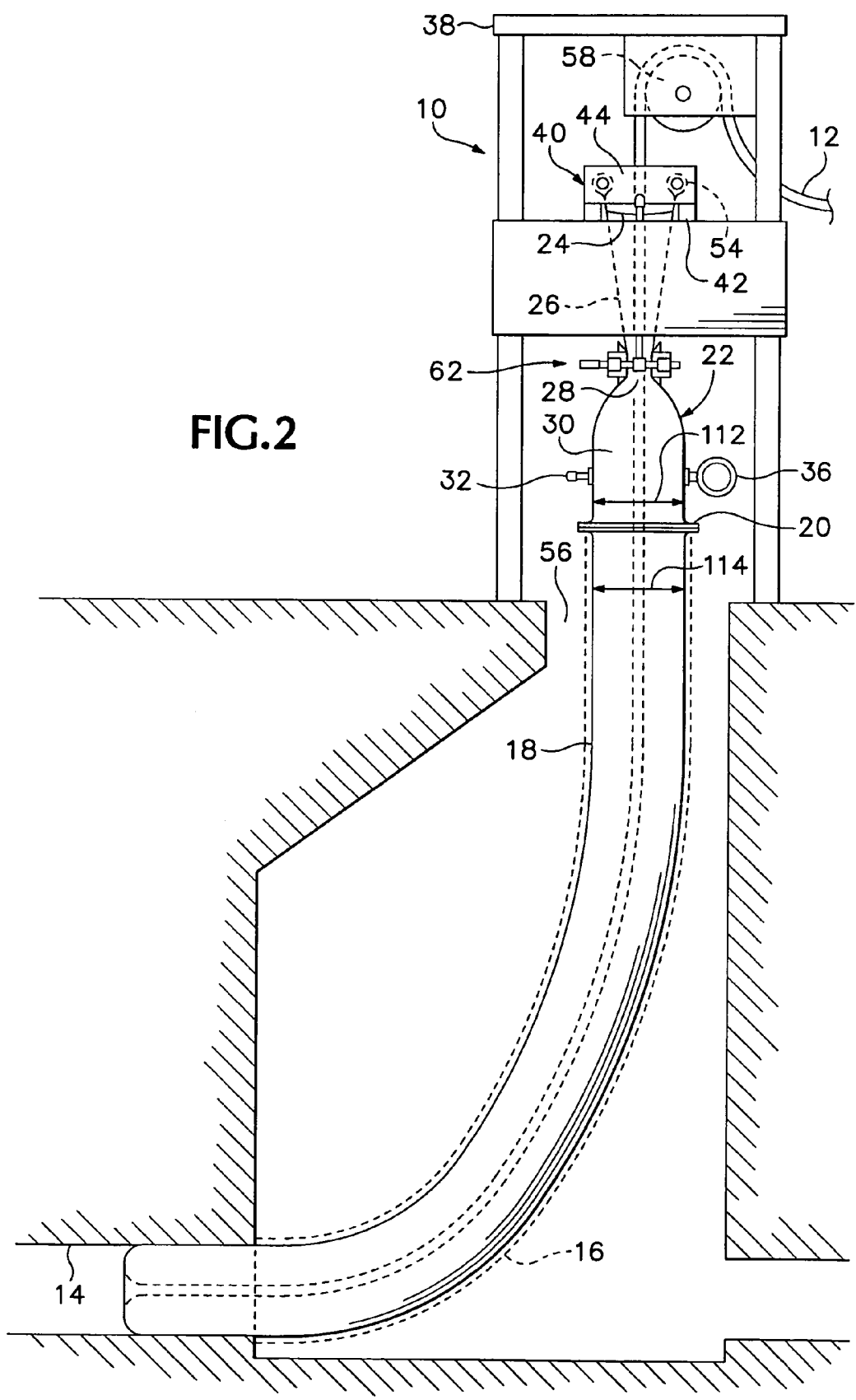
FIG. 2 is an elevational view, at a reduced scale, of the apparatus shown in FIG. 1, showing the feeder in use to install a liner into a large underground sewer pipe.

Referring now to the drawings which form a part of the disclosure herein, in FIGS. 1 and 2 a liner installation apparatus 10 is used to install a liner 12 into a pipe or other tubular vessel such as a sewer pipe 14, from a supply such as a stack 16 of tubular liner material which has been prepared for installation, as by being impregnated with a quantity of an uncured resin, and by being placed into a flattened, folded, inside-out configuration arranged for progressive easy removal from the stack 16. Typically the liner 12 is folded flat, and it may be folded double in readiness for inversion, as shown, for example, in FIG. 19 of Waring et al. U.S. Pat. No. 6,390,795. The liner is of a size to fit snugly inside the pipe into which it is to be installed.

A near-end portion 18 of the liner 12 has been inverted and pulled back along the inside-out liner 12 into a right-side-out configuration as shown in FIG. 1. The near-end portion 18 is connected to an outfeed end 20 of a feeder 22 through which the liner 12 extends from the stack 16 toward the sewer pipe 14, as shown in FIG. 2.

The feeder 22 is of a flexible, strong material, and has a generally tubular body 26 that includes a mouth 24 that is open at a first or upper end of the generally tubular body 26. A throat portion 28 is a small distance, such as 10 to 30 inches, beneath the mouth 24, and separates the mouth 24 from a pressure-containing section 30 that extends from the throat 28 to the outfeed end 20.

An inlet port 32, preferably including a valve 34, is mounted in the pressure-containing section 30 and communicates with the interior of the pressure-containing section 30, so that fluid under pressure, such as pressurized air, steam, or water can be fed into the pressure-containing section 30. A pressure gauge 36 is preferably also mounted in the pressure-containing section 30 to indicate the pressure in the pressure-containing section 30 during installation of the liner 12.

The liner installation apparatus 10 includes a suitable support structure for the feeder 22 such as the stand 38. A feeder support assembly 40 attached to the stand 38 includes a pair of support beams 42 extending across an opening defined by the stand 38. A pair of end plates 44 are mounted on the support beams 42 and define aligned holes 46 through which feeder support bars 48 are removably fitted. The end plates 44 are spaced apart from each other along the support beams 42 by a distance greater than the width 50 of the folded inside-out portion of the liner 12, which passes downward between the end plates 44 into the mouth 24 of the feeder 22.

The feeder 22 is suspended from the feeder support bars 48, with feeder mounting connectors attached to the feeder support bars 48 and extending down toward the mouth 24. For example mounting connectors may simply be extensions of the body 26 in the form of flaps or ears 52 of flexible material such as that of the body 26, extending upward from the mouth 24 and suitably fastened, as by being sewn or riveted, to form long loops or tubes 54 encircling and supported by the feeder support bars 48 on each side of the mouth 24 and the liner 12.

The feeder support bars 48 can be removed and replaced by being slid longitudinally through the holes 46 to engage or disengage the tubes 54. It will be understood that while the flaps 52 are shown as integral extensions of the feeder 22 extending beyond its mouth 24, the flaps 52 may be of separate material secured to the feeder 22 between the throat 28 and the mouth 24 in the appropriate positions as by being sewn, bolted, or riveted, or by use of an adhesive.

The stand 38, shown herein as a simple four legged frame, can be of any convenient design, such as including a collapsible or easily disassembled frame. The stand 38 is placed where needed for use, as above an open manhole 56, so that the feeder 22 and the attached near-end portion 18 of the liner 12 can extend downward from the stand 38 toward the sewer pipe 14 or other tubular vessel in which the liner 12 is to be installed.

The body 26 of the feeder 22 is made of a strong flexible fabric, and may be of the same fabric of which the liner 12 is constructed, usually a needled felt material of polyester or synthetic fiber structure. The feeder could also be made of another strong flexible sheet material, such as a cloth of synthetic fibers such as aramid or paramid fibers, preferably substantial enough not to stretch a great deal under the usual pressures used for inverting a liner.

A roller 58 is preferably mounted rotatably on the stand 38 so as to support and guide the folded, inside-out tubular liner 12 as it is fed from the stack 16 into the mouth 24 of the feeder 22.

A throat regulating mechanism 62 is suspended below the end plates 44, supported at the location of the throat 28 by hanger rods 64 whose upper ends are fastened to the end plates 44. Preferably a fork 66 mounted on the upper end of each hanger rod 64 is pinned to the respective end plate 44 so as to permit at least a few degrees of pivoting movement of the throat regulating mechanism 62 about the pins with respect to the end plates 44. The feeder 22 is thus free to move somewhat beneath the support assembly 40 during installation of the liner 12 in the sewer pipe 14 or other intended location of the liner.

Figure 3:
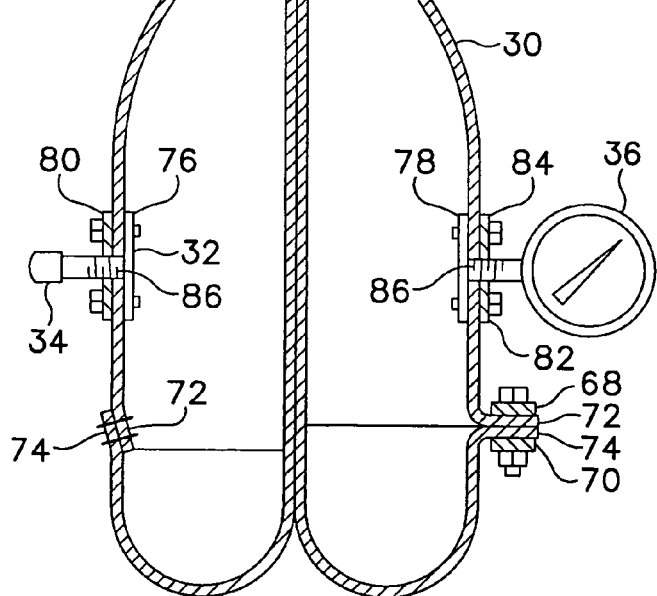
FIG. 3 is a schematic sectional view taken along line 3-3 in FIG. 1, showing the feeder and support assembly ready for use to invert a liner tube.

The outfeed end 20 of the feeder 22 may have a pair of mated annular clamping plates 68 and 70 bolted together on opposite sides of radially extending margins, such as an end skirt 72 or marginal portion of the feeder 22 and an outwardly flexed margin 74 of the near-end portion 18 of the liner 12, to provide a fluid-tight interconnection of the outfeed end 20 of the feeder 22 with the near-end portion 18 of the liner 12, as shown in greater detail at the right-hand side of FIG. 3.

Alternatively, as shown in the left-hand portion of FIG. 3, the end skirt 72 of the outfeed end 20 of the feeder 22 may be sewn, riveted, or adhesively attached, depending upon the thickness and size of the liner 12, to the end margin portion 74 of the near-end portion 18 of the liner 12. Optionally, the feeder 22 may simply be an extension of the liner 12, with the suspension flaps 52 or other mounting connector portions attached adjacent the mouth 24, as by having suitable suspension straps or flaps riveted, sewn, or adhesively attached to the liner material near the mouth 24, or simply formed as integral extensions of the flexible material of the liner 12 and feeder 22.

As can be seen best in FIG. 3, the inlet port 32 and pressure gauge 36 may be fastened securely to the flexible material of the pressure-containing section 30 by the inclusion of suitably large flanges 76, 78 within the pressure-containing section 30 and mating annular clamping plates 80, 82 on the outer side of the pressure-containing section 30 and connected to the respective flange by suitable fasteners such as bolts 84, or mated with a gauge or port conduit by threads 86. The flanges 76 and 78 and the mating clamping plates 80 and 82 must be large enough to provide a secure sealing attachment to the pressure-containing section 30, taking into account the flexibility and elasticity of the material of which the pressure-containing section 30 is made.

Figure 4:
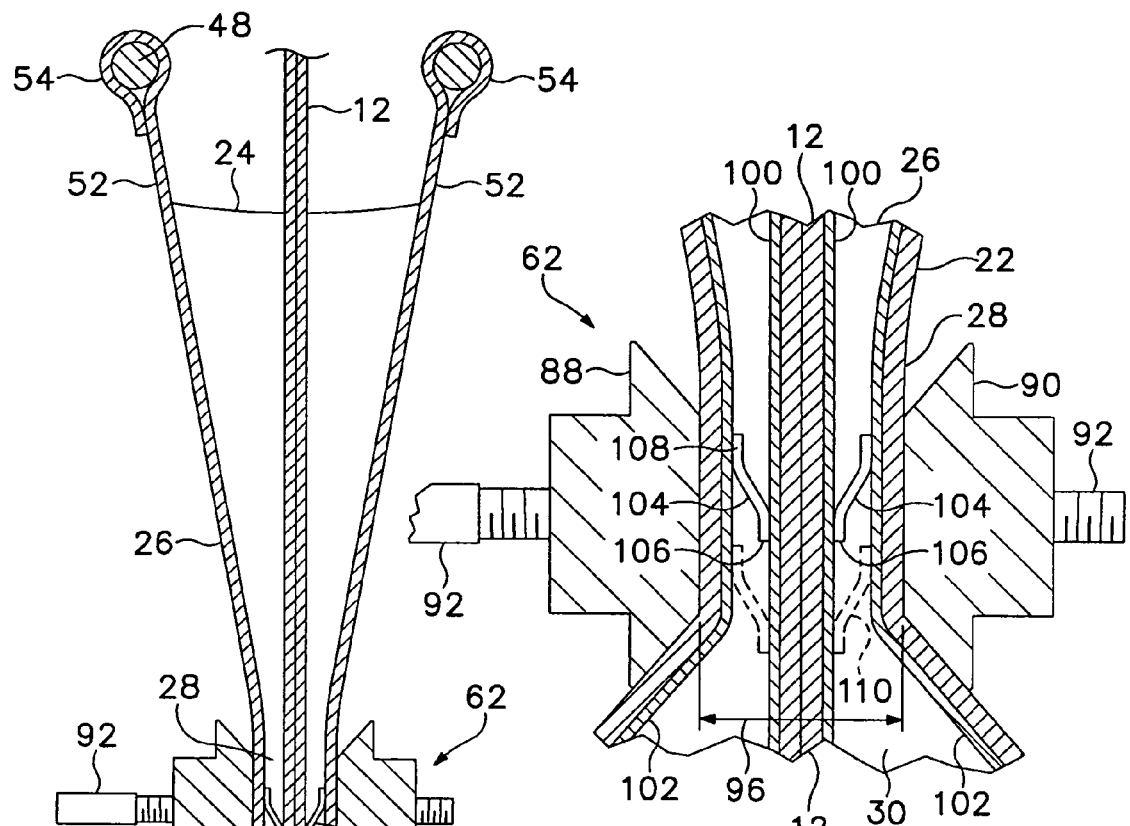
FIG. 4 is a sectional detail view, at an enlarged scale, showing a throat portion of the feeder and a liner tube being fed through the feeder to be inverted, together with a throat regulating mechanism.
Figure 5:
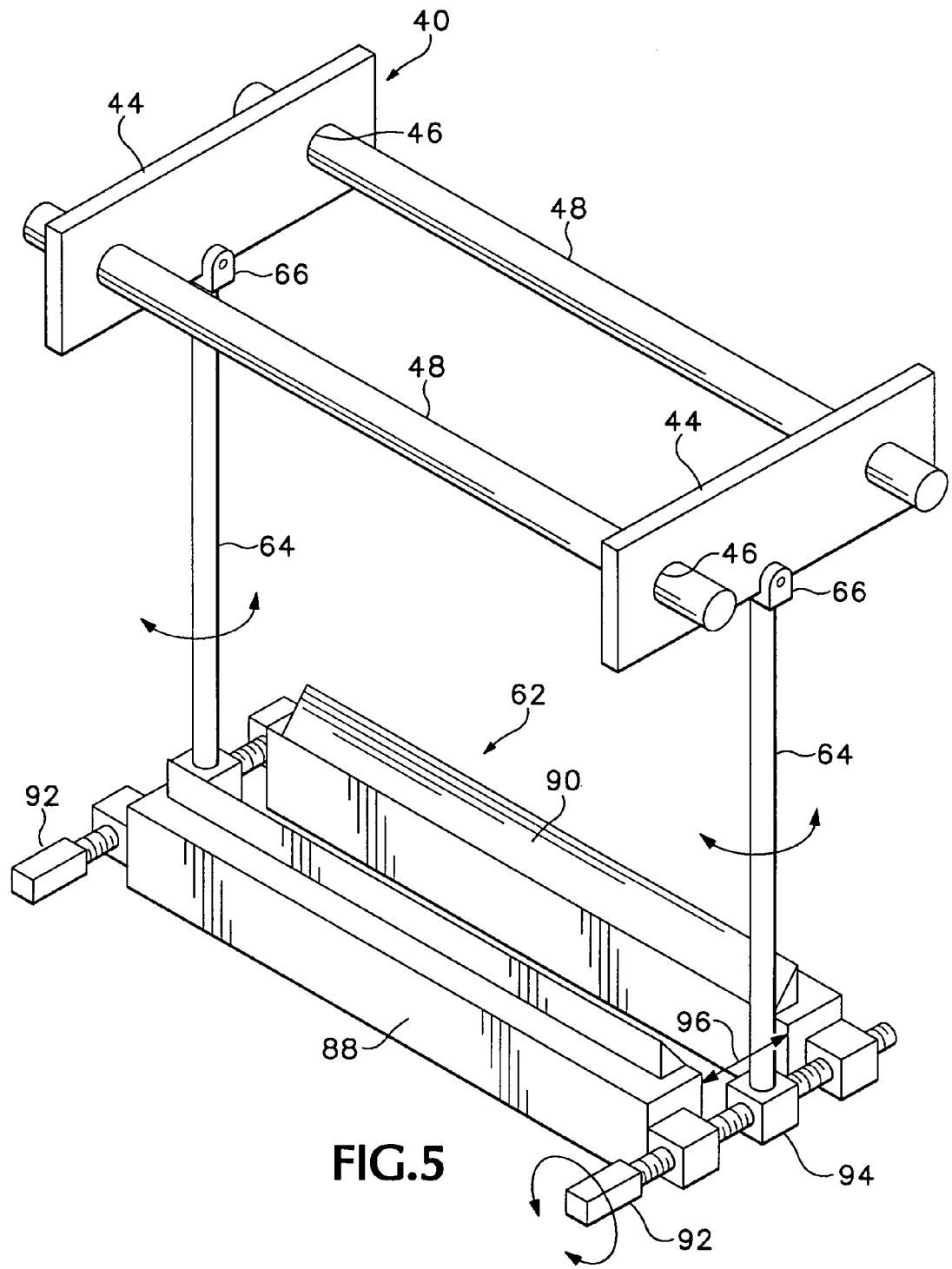
FIG. 5 is an isometric view, at an enlarged scale, of the feeder support apparatus and throat supporting and regulating mechanism for use with the feeder.

As can be seen best in FIGS. 4 and 5, the throat regulating mechanism 62 includes a pair of throat support bars 88 and 90 adjustably supported on adjustment screws 92 engaged with threaded bores in the support bars 88 and 90 and mounted rotatably in suitable journals 94 supported at the lower ends of the hanger rods 64. The opposite end portions of each adjustment screw 92 are oppositely threaded, so that rotation of each adjustment screw 92 moves the throat support bars 88 and 90 equally either toward or away from the lower end journals 94, increasing or decreasing the distance 96 between the throat support bars 88 and 90, to shape and control the available space within the throat 28.

Typically the material used for a liner 12 includes a surface layer 100 of a synthetic plastic material, usually in the form of a 10 to 15 mil thickness of flexible polyurethane bonded to the felt, that is exposed as an inner surface of the liner 12 when the liner 12 has been inverted into its final location in a tubular vessel such as the sewer pipe 14. The layer 100 is usually formed by spraying the polyurethane onto the felt in a liquid state and allowing it to fuse onto and around the fibers. The layer 100 is preferably fairly slippery, and can also be lubricated suitably to slide easily through the throat 28. Once the liner 12 has been installed the layer 100 permits materials to move easily through the lined sewer pipe 14.

A similar layer 102 is preferably located on the interior side of the feeder 22, where it helps to prevent escape of fluid under pressure. The layer 102 also helps the liner 12 to slide easily through the throat 28, while adjustment of the screws 92 to narrow the throat 28 by moving the throat support bars 88 and 90 toward each other helps the pressure-containing section of the feeder 22, beneath the throat 28, to be pressurized by introduction of pressurized air or steam through the port 32 into the pressure-containing section 30. Adjustment of the throat regulating mechanism 62 keeps the pressurized fluid within the pressure-containing section 30 well enough for the pressure within the pressure-containing section 30 to be increased as necessary to pull the liner 12 into the pressure-containing section 30 through the throat 28 and then to extend the liner into the sewer pipe 14 or other vessel being lined and invert the liner 12 at its leading end within the sewer pipe 14.

To improve the ability of the throat 28 to restrict escape of pressurized fluid from within the pressure-containing section 30, elongate outer margins 108 of flexible pressure retention flaps 104 may be fastened to the interior surface of the throat 28, located correspondingly with the mounting connectors 52 and extending parallel with the throat support bars 88 and 90, with the free, inner margins 106 of the flaps 104 facing inward, toward the pressure-containing section 30, as shown in FIG. 4. The flaps 104 may be molded or made from a sheet of a synthetic plastic material similar to that of the layer 102, which can be thermally or chemically welded to a layer 102, for simplification of manufacture, or the outer, fastened margins 108 of the flaps 104 can be sewn or otherwise fastened to the material of the throat portion 28 of the feeder 22. Preferably a pair of oppositely located flaps 104 are provided, and optionally a second pair of flaps 110 could also be provided. Even a single flap 104 aligned along one of the throat support bars 88 and 90 would be of significant utility in helping to limit the escape of pressurized fluid from within the pressure-containing section 30, by bending to press against an adjacent surface of the flattened, folded liner 12 while also extending across at least a portion of any gap between the opposite sides of the portions of the throat 28 not occupied by the liner 12.

The adjustment screws 92 should be adjusted to close the throat 28 snugly enough against the liner 12 to restrict the ability of pressurized fluid to escape from within the pressure-containing section 30 without unduly restricting the ability of the liner 12 to slide through the throat and into the pressure-containing section 30. Thus the throat 28, supported by the throat regulating mechanism 62, provides at least a partially sealing closure around the flattened tube being extended and inverted. The force of friction between the flaps 104 and the liner 12 is small enough so that a reasonably small pressure differential between the interior of the pressure-containing section 30 the feeder 22 and the ambient atmosphere, such as a gauge pressure of 2 to 20 pounds per square inch, urging the flaps 104 toward the liner 12, is sufficient to pull the inside-out liner 12 into the feeder 22 to be extended and inverted in its desired location within the sewer pipe 14.

In a preferred embodiment the feeder 22 will have a diameter 112 larger than the diameter 114 of the liner 12, to ensure freedom of the liner 12 to slide easily through the feeder 22. The flexible feeder 22 can be made of appropriate diameters 112 to be used with flexible liners 12 whose diameters 114 may be in the range of 6 inches to 84 inches, but is expected to be most useful with installation of large diameter liners, with diameters 114 in the range from 18 inches to 84 inches. It will also be understood that with the liner 12 flattened and folded double a feeder 22 of a smaller diameter 112 is workable and can be used in situations where access to a large pipe is restricted by a smaller size of a manhole through which the liner 12 must be installed. In such a situation it may also be preferred to utilize a feeder extension portion (not shown), or a restricting sleeve 116 shown in broken line in FIG. 2, smaller in diameter than the pipe to be lined, to extend from the outfeed end 20 of the feeder to a position adjacent the open near end of the sewer pipe segment or other pipe to be lined. Particularly in the case of a liner installation where relatively high pressure must be used because of the amount of drag to be expected, as where a very long section of liner is to be installed, or where a relatively stiff liner is to be installed in a relatively small conduit, it may be desirable for such an extension or sleeve 116 to be of strong, inelastic flexible material in order to provide ample strength and support for the near-end portion 18 of the liner between the proximal mouth of the sewer pipe 14 and the outfeed end 20 of the feeder 22.

When manufactured of material similar to that of the liner to be installed, the feeder 22 is inexpensive, particularly by comparison to the previously used metal pressure containment apparatus, and the feeder 22 can be discarded after use if it has become contaminated by a quantity of the resin used to harden and secure a liner within a repaired pipe.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

I claim:

1. A feeder for use in installing a flexible tubular liner into a pipe, comprising:
    (a) a generally tubular body of flexible material having:
        (i) a mouth end defining an open mouth;
        (ii) an outfeed end opposite said mouth end;
        (iii) a throat portion defined between said mouth and said outfeed end; and
        (iv) a pressure-containing section of said tubular body extending from said throat portion to said outfeed end, said outfeed end being attachable to a near end of a tubular liner so as to provide a fluid-tight communication between an interior of said pressure-containing section and an interior of said tubular liner; and
    (b) a fluid inlet port defined in said pressure-containing section and communicating with said interior of said pressure-containing section.

2. The feeder of claim 1 including a valve arranged to control fluid flow through said fluid inlet port.

3. The feeder of claim 1 including a pressure gauge arranged in communication with said interior of said pressure-containing section to measure fluid pressure within said pressure-containing section.

4. The feeder of claim 1 including a feeder mounting connector attached to said tubular body adjacent said mouth end and arranged to be attached to a support structure so as to support said feeder.

5. The feeder of claim 4 wherein said mounting connector includes an ear attached to said tubular body near said mouth end.

6. The feeder of claim 1 including mounting connector means for engaging a support structure and supporting said tubular body with said mouth open to receive said flexible tubular liner.

7. The feeder of claim 1 including a pressure retention flap mounted within said throat in position to engage a tubular liner extending through said throat.

8. The feeder of claim 1 wherein said outfeed end of said body has a diameter at least as great as a diameter of said flexible tubular liner.

9. The feeder of claim 1 including an extension support wrapper sleeve of flexible strong fabric extending from said outfeed end to a proximal end of said pipe.

10. A liner installation apparatus for use in installation of a flexible tubular liner in a pipe, the apparatus comprising:
   (a) a length of flexible tubular liner of a size intended to fit within said pipe as an installed liner;
   (b) a feeder including a generally tubular body of flexible material, having:
      (i) a mouth end defining an open mouth;
      (ii) an outfeed end opposite said mouth end;
      (iii) a throat portion defined between said mouth and said outfeed end; and
      (iv) a pressure-containing section of said tubular body, extending from said throat portion to said outfeed end, said outfeed end being attachable to a near end of a tubular liner so as to provide a fluid-tight communication between an interior of said pressure-containing section and an interior of said tubular liner; and
   (c) a fluid inlet port defined in said pressure-containing section and communicating with said interior of said pressure-containing section, and wherein a near-end portion of said tubular liner, attached to said outfeed end of said tubular body in a right-side-out configuration, with an integrally attached uninstalled portion of said tubular liner extending through said mouth and throat and thence through said interior of said pressure-containing section to said near-end portion in an inside-out configuration, whereby an increased fluid pressure within said pressure containing portion can urge said tubular liner to extend itself within and along said pipe and invert itself therein.

11. The system of claim 10 further including a throat-regulating mechanism associated with said throat portion to compress and shape said throat portion around said uninstalled portion of said tubular liner located within said throat, in order to limit escape through said throat of fluid under pressure from within said pressure-containing section of said feeder while said uninstalled portion of said tubular liner moves through said throat into said pressure-containing section of said feeder.

12. The system of claim 10, said feeder also including an outfeed end skirt in said pressure-containing section, downstream from said mouth and beyond said throat, attached to a near-end portion of said tubular liner, whereby said tubular liner can be pulled into said throat through said mouth and inverted into a desired location in said pipe by pressurizing said feeder between said throat and said near-end portion of said liner.

13. The system of claim 10 including a feeder mounting connector attached to said tubular body adjacent said mouth end and arranged to be attached to a support structure so as to support said feeder.

14. The system of claim 13 wherein said mounting connector includes an ear attached to said tubular body near said mouth end.

15. The system of claim 10 including mounting connector means for engaging a support structure and supporting said tubular body with said mouth open to receive said flexible tubular liner.

16. The system of claim 10 including a pressure retention flap mounted within said throat in position to engage a tubular liner extending through said throat.

17. The system of claim 10 wherein said outfeed end of said body has a diameter at least as great as a diameter of said flexible tubular liner.

18. The system of claim 10 including an extension support wrapper sleeve of flexible strong fabric extending from said outfeed end to a proximal end of said pipe.

19. Apparatus for use in installing an elongate flexible tubular liner into a pipe, comprising:
   (a) a feeder support apparatus;
   (b) a feeder having a generally tubular body constructed of flexible sheet material and including a mounting connector attached to and supported by said feeder support apparatus, said feeder having an open mouth large enough to receive and permit longitudinal passage of a portion of said flexible tubular liner in a flattened inside-out configuration into said feeder and through said mouth;
   (c) a throat spaced inwardly apart from said mouth along said feeder body;
   (d) an outfeed end adapted for fluid-tight connection to an inverted right-side-out near-end portion of said flexible tubular liner so as to retain fluid pressure within a space within said feeder and surrounding said inside-out portion of said tubular liner between said throat and said outfeed end; and
   (e) a throat regulating mechanism engaging said throat externally of said body and pressing a portion of said throat inwardly around said inside-out portion of said flexible tubular liner between said mouth and said outfeed end.

20. The apparatus of claim 19 wherein said throat regulating mechanism engages said throat tightly enough to maintain an elevated fluid pressure within said pressure-containing section of said feeder.

21. A method of installing a flexible tubular liner in a pipe, comprising:
   (a) supporting a flexible, generally tubular feeder outside a near end of a pipe in which a liner is to be installed by inversion into said near end, with an inside-out portion of said tubular liner extending from a supply length of said flexible tubular liner through said feeder to a right-side-out portion of said tubular liner integrally connected with said inside-out portion and attached to an outfeed end of said feeder;
   (b) supporting and shaping a throat portion of said flexible tubular feeder so as to limit passage of a fluid through said throat while forcing a quantity of a fluid under pressure into said flexible tubular feeder between said throat portion and said outfeed end of said feeder, thereby increasing fluid pressure within said right-side-out portion of said liner and a portion of said feeder adjacent said outfeed end;
   (c) feeding said supply length of inside-out tubular liner into said feeder through said throat, thereby causing a portion of said inside-out portion of said liner to invert itself into an interior of said pipe; and
   (d) continuing to force additional quantities of said fluid into said flexible feeder and thereby causing said supply length of said tubular liner to be everted into said tubular vessel.

22. The method of claim 21 including the further step of providing a seal mechanism within said throat portion of said feeder and causing said seal mechanism to conform to a surface of said inside-out portion of said tubular liner while permitting said tubular liner to slide through said throat to be inverted within said tubular vessel.

* * * * *